United States Patent [19]

Sakakibara

[11] Patent Number: 4,899,621
[45] Date of Patent: Feb. 13, 1990

[54] AUTOMATIC TRANSMISSION FOR VEHICLES

[75] Inventor: Shiro Sakakibara, Toyokawa, Japan

[73] Assignee: Aisin-Warner Kabushiki Kaisha, Anjo, Japan

[21] Appl. No.: 307,250

[22] Filed: Feb. 6, 1989

Related U.S. Application Data

[63] Continuation of Ser. No. 81,527, Aug. 3, 1987, abandoned, which is a continuation of Ser. No. 476,541, Mar. 19, 1983, abandoned.

[51] Int. Cl.$^4$ ............................................. F16H 37/08
[52] U.S. Cl. .................................. 475/205; 74/606 R; 475/200; 475/206; 475/312
[58] Field of Search ............. 74/695, 701, 740, 781 R, 74/750 R, 753, 730, 694, 606 R

[56] References Cited

U.S. PATENT DOCUMENTS 4,716,786 1/1988 Sakakibara ........................ 74/701 X Primary Examiner—Rodney H. Bonck
Assistant Examiner—Christopher Campbell
Attorney, Agent, or Firm—Cooper & Dunham

[57] ABSTRACT

An automatic transmission for motor vehicles, including a first shaft rotatably supported by the automatic transmission case and consisting of an input shaft coupled with the engine output shaft through a joint like a fluid joint or a friction clutch and an output shaft disposed in series and coaxially with the input shaft and mounting an output gear; a second shaft consisting of a long shaft rotatably supported by the transmission case parallel with the first shaft and a short shaft rotatably mounted on the long shaft, one of the long and short shafts having an input gear connected to the output gear of the first shaft by direct meshing engagement therewith or through a chain or an idler gear while the other one having an output gear mounted thereon; a differential having a large drive gear connected to the output gear of the second shaft by direct meshing engagement therewith or through a chain or an idler gear; a first speed-changing planetary gear mechanism provided between the input and output shafts of the first shaft; and a second speed-changing planetary gear mechanism provided between the input and output shafts of the second shaft.

3 Claims, 4 Drawing Sheets 4,899,621

AUTOMATIC TRANSMISSION FOR VEHICLES

This is a continuation of application Ser. No. 081,527, filed Aug. 3, 1987, abandoned which, in turn, is a continuation of Ser. No. 476,541 filed Mar. 19, 1983 abandoned.

BACKGROUND OF THE INVENTION

1. Field of the Invention

This invention relates to an automatic transmission for motor vehicles.

2. Description of the Prior Art

There is known in the art an automatic transmission including a first shaft rotatably supported by the automatic transmission case and consisting of an input shaft coupled with the output shaft of the engine through a fluid joint or a friction clutch and an output shaft disposed coaxially in series with the input shaft and mounting thereon an output gear; a second shaft consisting of a long shaft rotatably supported by the automatic transmission case parallel with the first shaft and a short shaft rotatably mounted on the long shaft, one of the long and short shafts serving as an input shaft having an input gear connected to an output gear on the first shaft by direct meshing engagement therewith or through a chain or an idler gear while the other one serving as an output shaft having an output gear; a differential having a large drive gear connected to the output gear of the second shaft by direct meshing engagement therewith or through a chain or an idler gear; a first speed-changing planetary gear mechanism provided between the input and output shafts of the first shaft; and a second speed-changing planetary gear system provided between the input and output shafts of the first shaft. In this sort of automatic transmission, there has been a difficulty that the long shaft of the second shaft which transmits large torque is bent due to the bending stress which is imposed on the input and output gears, giving rise to a problem that the service life of bearings at various sliding parts is shortened by localized application of load. Especially in a case where the load point of the output gear of the second shaft, which transmits an increased torque upon deceleration, is located away from the bearing which supports the output gear of the second shaft, the long shaft is subjected to a greater bending moment and the life of the bearing is shortened to a considerable degree.

SUMMARY OF THE INVENTION

It is therefore a primary object of the present invention to provide a vehicular automatic transmission which is constructed to reduce the bending stress as imposed on the long shaft of the second shaft, thereby to prolong the service life of bearings at various sliding portions.

According to the present invention, there is provided an automatic transmission for motor vehicles, including a first shaft rotatably supported by the automatic transmission case and consisting of an input shaft coupled with the engine output shaft through a joint like a fluid joint or a friction clutch and an output shaft disposed in series and coaxially with the input shaft and mounting an output gear; a second shaft consisting of a long shaft rotatably supported by the transmission case parallel with the first shaft and a short shaft rotatably mounted on the long shaft, one of the long and short shafts having an input gear connected to the output gear of the first shaft by direct meshing engagement therewith or through a chain or an idler gear while the other one having an output gear mounted thereon; a differential having a large drive gear connected to the output gear of the second shaft by direct meshing engagement therewith or through a chain or an idler gear; a first speed-changing planetary gear mechanism provided between the input and output shafts of the first shaft; and a second speed-changing planetary gear mechanism provided between the input and output shafts of the second shaft.

The above and other objects, features and advantages of the present invention will become apparent from the following description and appended claims, taken in conjunction with the accompanying drawings which show by way of example preferred embodiments of the invention.

DESCRIPTION OF PREFERRED EMBODIMENTS

Figure 1:
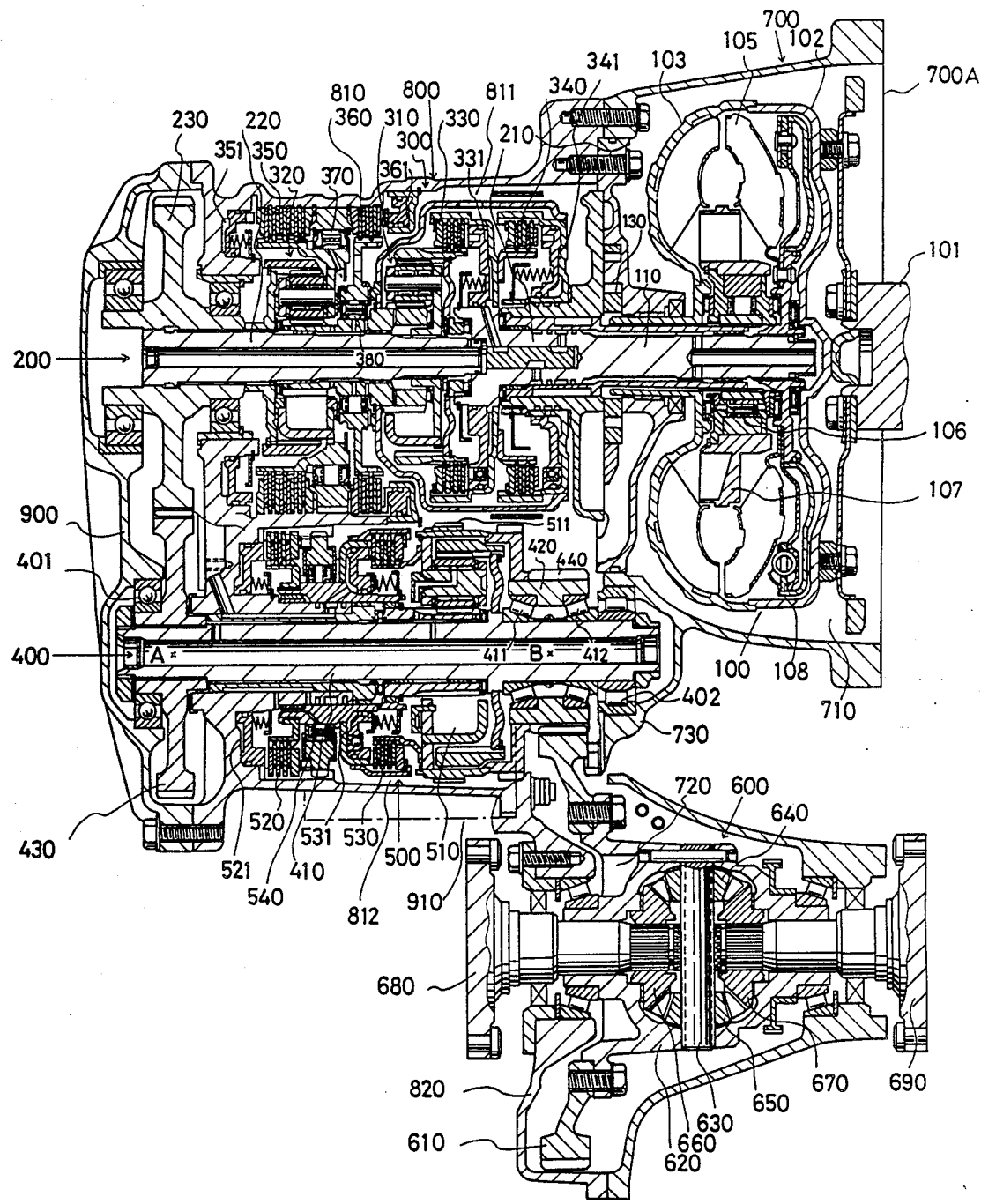
FIG. 1 is a diagrammatic sectional view of a conventional vehicular automatic transmission.

Referring to FIG. 1, there is shown an automatic transmission for a front-engine/front-drive type motor vehicle, which includes in its power train: a fluid joint in the form of a torque converter 100; a first shaft 200 consisting of an input shaft 210 formed integrally with the output shaft 110 of the torque converter 100 and an output shaft 220 mounted concentrically with the input shaft 210 and having an output gear 230 splined at its rear end (at the end away from the engine); a first speed-changing planetary gear mechanism 300 provided, between the input and output shafts 210 and 220 of the first shaft; a second shaft 400 supported by the transmission case parallel with the first shaft and having an input gear 430 splined at its rear end in meshing engagement with the output gear 230 of the first shaft, the second shaft having on the side of its fore end (on the side of the engine) a long shaft supported by the transmission case through bearings to serve as an input shaft 410 and a short shaft 420 rotatably supported on the front end of the input shaft and provided with an output gear 440; a second speed-changing planetary gear mechanism 500 provided between the long input shaft 410 and the short output shaft 420; and a differential 600 mounted parallel with the second shaft and having a large drive gear 610 in meshing engagement with the output gear 440 of the second shaft. The torque converter 100 includes a front cover 102 connected to the engine output shaft 101, a pump impeller 103 coupled with the front cover 102, a turbine runner 105 coupled with the input shaft 110, a stator 107 connected to the transmission case through a one-way clutch 106, and a direct coupling clutch 108. The first planetary gear mechanism 300 which is provided between the input and output shafts 210 and 220 of the first shaft 200 constitutes an underdrive mechanism for establishing three forward and one reverse ranges, and includes a front planetary gear set 310, a rear planetary gear set 320, a first multiple disk clutch 330; a hydraulic servo 331 for engaging and releasing the first multiple disk clutch, a second multiple disk clutch 340 and a hydraulic servo 341 therefor, a first multiple disk brake 350 and a hydraulic servo 351 therefor, a second multiple disk brake 360 and a hydraulic servo 361 therefore, one-way clutches 370 and 380. The second planetary gear mechanism 500 which is provided between the input and output shafts 410 and 420 of the second shaft 400 includes a planetary gear set 510, a multiple disk brake 520 and a hydraulic servo 521 therefor, a multiple disk clutch 530 and a hydraulic servo 531 therefor, and a one-way clutch 540. The differential 600 includes a large drive gear 610 which is meshed with the output gear 440 of the second shaft, a differential gear box 620 which is secured to the large drive gear by bolts and rotatably supported by the automatic transmission case, a small gear shaft 630 which has its opposite ends securely fixed to the center peripheral wall of the gear box 620 through pins in the direction of rotation of the gear box 610, a pair of small differential gears 640 and 650 rotatably mounted on the small gear shaft 630 within the gear box 620, large differential gears 660 and 670 which are meshed with the small differential gears 640 and 650, and wheel axles 680 and 690.

The above-described automatic transmission is housed in an automatic transmission case, including a torque converter case 700 consisting of a torque converter housing 710 having an open end face 700A fastened to the engine and accommodating the torque converter 100; a differential housing having an opening on the side remote from the engine and accommodating the differential 600, and a second shaft support wall portion 730 for supporting the fore end (the end on the side of the engine) of the second shaft; a transmission case consisting of a transmission room 810 having a first room 811 for accommodating the planetary gear mechanism 300 of the first shaft and a second room 812 for accommodating the planetary gear mechanism 500 of the second shaft, and a differential room side wall portion 820 closing the opening of the differential housing 720; and a gear cover 900 fastened to the side wall of the transmission case 800 on the side away from the torque converter. Denoted at 910 is a hydraulic control system of the automatic transmission, by which the discharge pressure of an oil pump 130 provided between the torque converter 100 and planetary gear mechanism 300 is regulated into a line pressure for supply to the hydraulic servo motors, torque converter and various parts which require lubrication to serve as operating or lubricating oil. With the foregoing construction, the input shaft 410 of the second shaft 400 has its rear end rotatably supported by a gear cover 900 through a bearing 401 and has its fore end rotatably supported by the second shaft support portion 730 of the torque converter case through bearing 402, so that the reaction force which is imposed on the input and output gears 430 and 440 during the torque transmitting operation acts as bending stress at points A and B of the input shaft 410 which supports the just-mentioned input and output gears. Since these points are between the bearings 401 and 412 which constitute the support points of the input shaft 410, large bending stress is imposed on the input shaft 410, displacing its center portion by about 0.7 mm.

Figure 2:
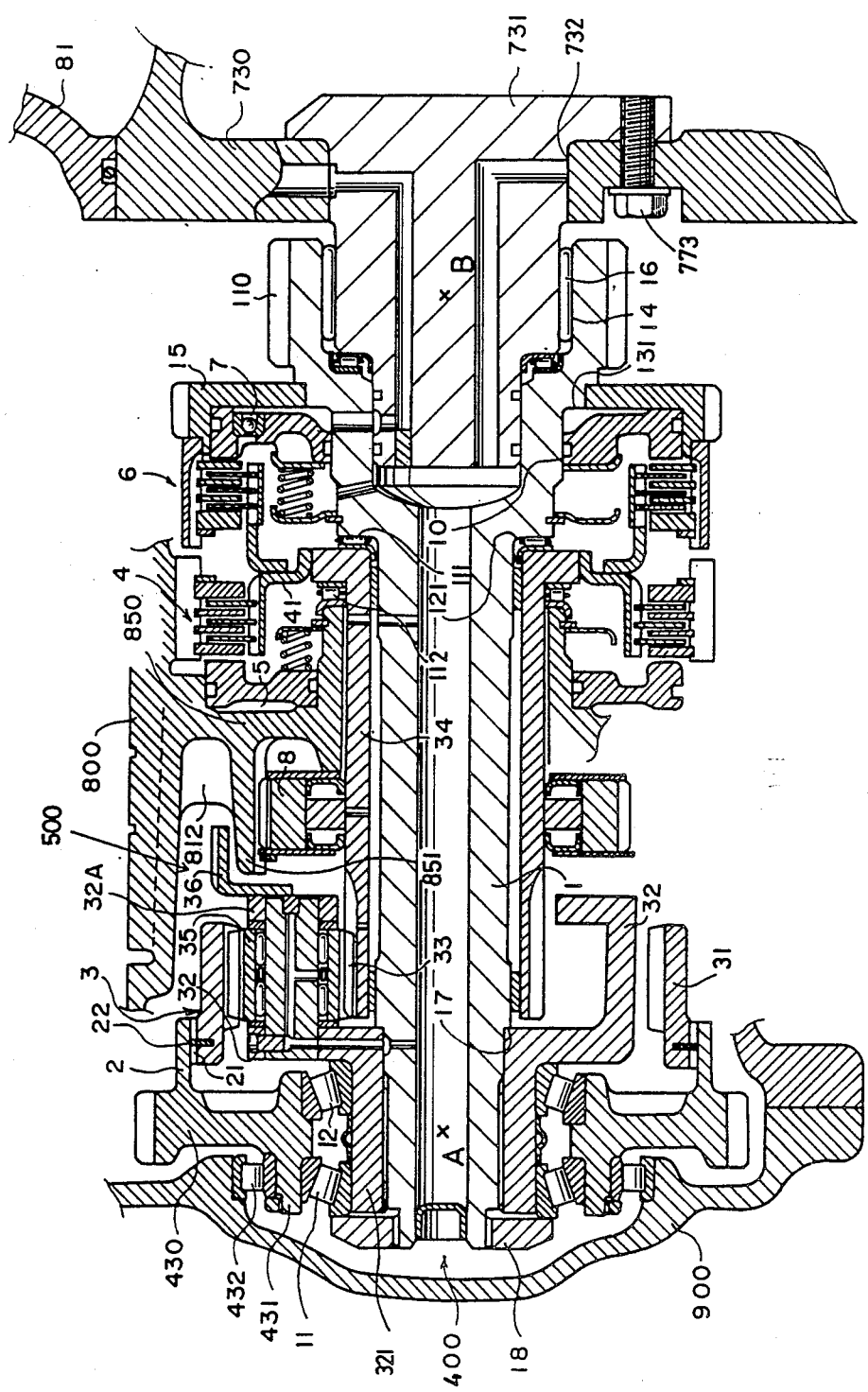
FIG. 2 is a diagrammatic sectional view of a second shaft in a vehicular automatic transmission according to the present invention.

Now, reference is had to FIG. 2 which illustrates a preferred embodiment of the present invention.

According to the present invention, the second shaft 400 consists of a long output shaft 1 and a short input shaft 2. At the rear end, the output shaft 1 is supported by the input gear 430 of the second shaft through a pair of taper bearings 11 and 12, and at the same time rotatably supported by the gear cover 900 of the automatic transmission case through a bearing 432 which is fitted in the hub 431 of the input gear. The long output shaft 1 is provided with a large-diameter portion 10 at its fore end with steps 121 and 131, and has an axial bore 14, which is formed in the distal large-diameter portion 10, rotatably fitted and supported through a roller bearing 16 on a support shaft 731 which is inserted from outside and fixed by bolts 773 in a support shaft mounting hole 732 in the second shaft support wall 730 of the torque converter case. The input shaft 2 is in the form of a cylinder with an inner spline 21 which is projected forward (toward the engine) from the input gear 430. The planetary gear mechanism 500 which is provided between the input and output shafts 2 and 1 of the second shaft includes a planetary gear set 3, a multiple disk brake 4, a hydraulic servo 5 formed in the front end portion of the intermediate wall 850 of the second room 812 of the transmission case for engaging or releasing the multiple disk brake 4, a multiple disk clutch 6, a hydraulic servo 7 formed in the wall on the rear side of a parking gear 15 welded to the large-diameter portion 10 at the fore end of the output shaft for operating the just-mentioned multiple disk clutch, and a one-way clutch 8.

The planetary gear set 3 includes a ring gear 31 which is splined on the cylindrical input shaft 2 projected from the input gear and fixed in position by a snap ring 22; a carrier 32 which is fitted on the rear end portion of the output shaft 1 with its hub portion 321 fixed between the stepped portion 17 and a stopper ring 18 threaded on the rear end of the output shaft 1; a sun gear 33 provided on a sun gear shaft 34 which is rotatably fitted on the output shaft 1 between the stepped portion 121 of the output shaft 1 and the carrier 32; and a planetary gear 35 rotatably supported by the carrier 32 and in meshing engagement with the ring and sun gears 31 and 33, the carrier 32 having a governor drive gear 36 welded to its fore end 32A. The multiple disk brake 4 serves to engage the sun gear shaft 34 fixedly with the transmission case 800 through the hub 41 welded to the fore end of the sun gear 34 or to release the engagement, while the clutch 6 establishes or releases the engagement of the sun gear shaft 34 with the parking flange 15 through the hub 41. The one-way clutch is mounted between a cylindrical projection 851 on the rear side of the intermediate wall 850 and the sun gear shaft 34.

When the brake 4 and the clutch 6 of the second planetary gear mechanism are released and engaged, respectively, the sun gear 33 is fixed to the carrier 32, transmitting the power at a reduction ratio of 1 through a path of input gear 430—input shaft 2—ring gear 31—planetary gear 35—carrier 32 (sun gear 33)—output shaft 1 (sun gear shaft 34, clutch 6, parking flange 15 and output shaft 1) - output gear 110. When the brake 4 and clutch 6 are engaged and released, respectively, the sun gear shaft 34 is fixed to the transmission case 800, so that the power is transmitted from the input gear 430—input shaft 2—ring gear 31—carrier 32—output shaft 1—output gear 110 to establish a reduced operation.

During operation of the second planetary gear transmission mechanism 500, the bending stress which results from the power transmission between the input gear 430 and the output gear 230 of the first shaft is imposed at point A of the output shaft 1, while the bending stress resulting from the power transmission between the output gear 110 and the large drive gear 610 of the differential is imposed at point B. In this instance, the stress which acts on point B in the present invention is supported by the support shaft 731 which is secured to the automatic transmission case through a roller bearing 16 of a large width, preventing the stress from being applied to the output shaft 1. Further, since the output gear 230 of the first shaft and the input gear 430 of the second shaft are helical gears, the thrust F1 which acts leftward in the drawing is applied to the stepped portion 17 through the taper roller bearings 11,12 and the carrier hub 321. The leftward thrust F2, which is caused by the use of a helical gear in the planetary gear set 3, is applied to the stepped portion 17 from the ring gear 31 through the input shaft 2, input gear 430, taper roller bearings 11 and 12 and carrier hub 321, in addition to the rightward thrust F3 which is caused by the use of the helical gears for the output gear 110 of the second shaft and the large drive gear 610 of the differential. Accordingly, the combined force of the thrusts F1 and F2 is counteracted by the thrust F3 and the differential force is supported by the intermediate wall 850 through the roller bearings 111 and 112.

Figure 3:
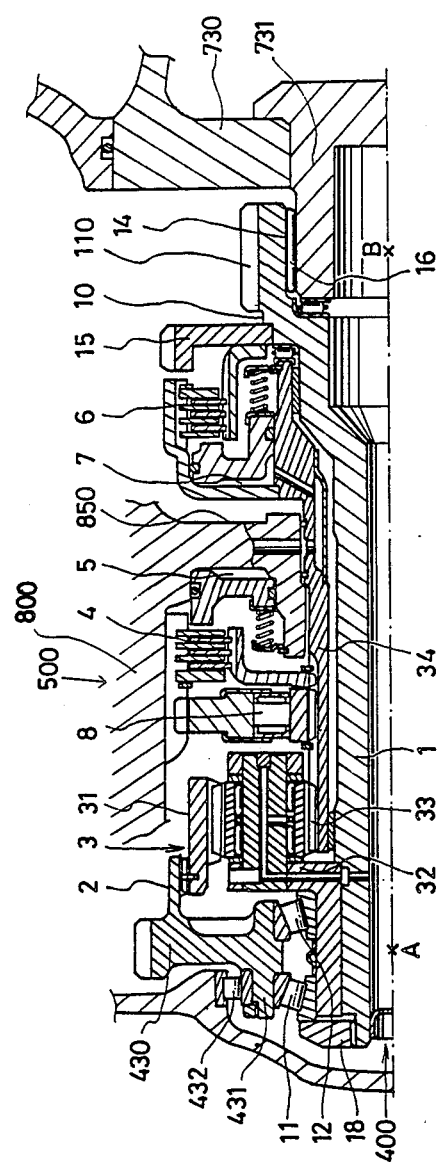
FIG. 3 is a view similar to FIG. 2 but showing a second shaft in another embodiment of the invention.

FIG. 3 illustrates another embodiment of the automatic transmission according to the present invention, in which the component parts common to FIG. 2 are designated by like reference numerals. In this embodiment, the one-way clutch 8 is mounted between the inner wall surface of the transmission case 800 and the sun gear shaft, and the multiple disk brake 4 and its hydraulic servo 5 are provided between the one-way clutch 8 and the intermediate wall 850, employing a hollow shaft for the support shaft 731.

Figure 4:
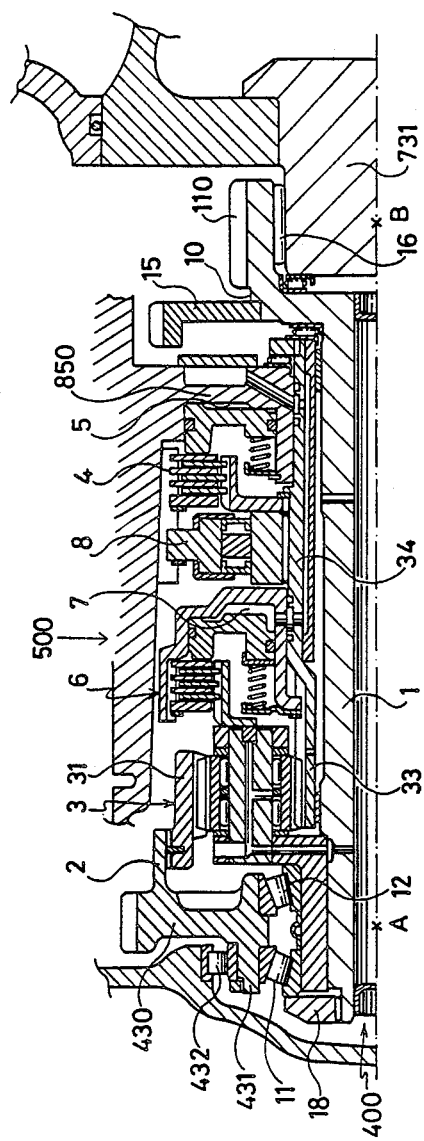
FIG. 4 is a view similar to FIG. 2 but showing a second shaft in still another embodiment of the invention.

FIG. 4 shows a further embodiment of the invention, in which like component parts are also designated by like reference numerals. In this case, the intermediate wall 850 is provided in a position closer to the engine (to the front end), and the clutch 6 and brake 4 including the respective hydraulic servo motors 5 and 7 are provided between the planetary gear set 3 and the intermediate wall 850, mounting the one-way clutch 8 between the clutch 6 and brake 4 to reduce the axial dimensions of the support shaft 731.

In the embodiments shown in FIG. 3 and 4, the bending moment resulting from the reaction force which is imposed on the output gear 110 during operation is similarly born by the support shaft 731 to reduce the bending moment to be applied to the output shaft 1 of the second shaft.

Although the support shaft has been described and shown as being fixed to the automatic transmission case by bolts in the foregoing embodiments, it may be formed by casting integrally with the torque converter case or other part of the automatic transmission case, or arrangements may be made to support the opposite ends of the second shaft by means of a support shaft. Further, the power transmission to or from the input and output gears of the second shaft may be effected through an idler gear or a chain if desired.

As clear from the foregoing description, the vehicular automatic transmission according to the present invention includes a first shaft rotatably supported by the automatic transmission case and consisting of an input shaft coupled wit the engine output shaft through a joint like a fluid joint r a friction clutch and an output shaft disposed in series and coaxially with the input shaft and mounting an output gear; a second shaft consisting of a long shaft rotatably supported by the transmission case parallel with the first shaft and a short shaft rotatably mounted on the long shaft, one of the long and short shafts having an input gear connected to the output gear of the first shaft by direct meshing engagement therewith or through a chain or an idler gear while the other one having an output gear mounted thereon; a differential having a large drive gear connected to the output gear of the second shaft by direct meshing engagement therewith or through a chain or an idler gear; a first speed-changing planetary gear mechanism provided between the input and output shafts of the first shaft; and a second speed-changing planetary gear mechanism provided between the input and output shafts of the second shaft. Thus, it becomes possible to minimize the bending stress which is imposed on the long shaft of the second shaft and consequently to prolong the service life of the bearings at various sliding portions.

We claim:

1. An automatic transmission for a motor vehicle, comprising in combination:

a first shaft rotatably supported by an automatic transmission case and having an input shaft coupled with an engine output shaft, an output shaft disposed coaxially in series with the input shaft, and a first output gear mounted on the output shaft;

a second shaft having a long shaft rotatably provided in parallel with the first shaft, including a second output gear mounted on one end of the long shaft and a short shaft rotatably mounted on the long shaft including an input gear connected to the first output gear such that the axial dimension of said support shaft is reduced;

a differential having a large drive gear connected to the second output gear;

a first speed-changing planetary gear mechanism constituting an underdrive mechanism provided on the first shaft; and a second speed-changing planetary gear mechanism connecting the short shaft to the long shaft on the second shaft, provided between the one end and the other end of the long shaft, and having a planetary gear set provided with a ring gear, a carrier and a sun gear, one of which is connected to the short shaft close to the first output gear and another of which is connected to the long shaft at the other end;

said long shaft being rotatably supported at the one end and the other end by the transmission case, provided with an axial bore at the one end, and rotatably supported at the axial bore through a bearing by a support shaft projectingly provided on the transmission case, such that the support shaft bears the reaction force imposed on the second output gear at the one end during power transmitting operation in order to minimize the bending moment transmitted to the output shaft of said second shaft.

2. An automatic transmission for a motor vehicle in accordance with claim 1 wherein said second speed-changing planetary gear mechanism comprises; a brake, and a clutch, the short shaft being coupled to the ring gear and said long shaft being coupled to the carrier, said sun gear being fixable to the case by means of the brake, and said sun gear and said carrier connected to each other by means of the clutch.

3. An automatic transmission for a motor vehicle according to claim 2 wherein said support shaft is fixed to the transmission case by bolts.

* * * * *